Patented Feb. 6, 1940

2,189,130

UNITED STATES PATENT OFFICE 2,189,130

REDUCTION PRODUCTS DERIVED FROM DEHYDROANDROSTERONE AND METHOD OF PRODUCING THE SAME

Adolf Butenandt, Danzig-Langfuhr, Free State, Danzig, assignor to Schering Corporation, Bloomfield, N. J., a corporation of New Jersey No Drawing. Application October 6, 1936, Serial No. 104,298. In Germany October 7, 1935

12 Claims. (Cl. 260—397)

This invention relates to reduction products derived from dehydroandrosterone and a method of producing the same. It relates also to intermediate compounds obtainable during the reduction of dehydroandrosterone, also known as $\Delta^{5,6}$-3-hydroxy-etio-cholenone-(17) and to a method for their production.

According to the present invention the hydroxyl group of the unsaturated hydroxy ketone dehydroandrosterone of the formula $C_{19}H_{28}O_2$ is replaced by halogen and the unsaturated halogenated ketone formed subjected to the action of reducing agents whereafter the halogen atom in the halogenated reduction product is reconverted into the hydroxyl group.

The dehydroandrosterone which serves as starting material for the process of the present invention may have been obtained in any convenient manner, for instance, by isolation from natural sources such as from urine of male individuals or the like, or by synthetic means, for instance, by oxidation of unsaturated sterols.

In order to replace the hydroxyl group of the unsaturated hydroxy ketone dehydroandrosterone by halogen the usual chemical methods may be resorted to. Preferably thionyl chloride is used as halogenating agent; the halogenation, however, may also be carried out by treating the hydroxy ketone with hydrochloric acid or other halogenating agents, including phosgene, phosphorus trichloride and pentachloride, and phosphorous oxychloride, as they are described, for instance, in Houben-Weyl, Methods of Organic Chemistry, 3rd vol, 3rd ed. (Leipzig 1930), p. 1115 seq.

From the reaction mixture formed the unsaturated halogenated ketone can be isolated by suitable methods, for example, by means of ketone reagents such as semicarbazide.

The treatment of the unsaturated halogenated ketone with hydrogen is preferably carried out with hydrogen catalytically activated by noble metal catalyst such as platinum or palladium.

In this hydrogenation procedure by the addition of two atoms of hydrogen to one molecule of the unsaturated halogenated ketone the corresponding saturated halogenated ketone is obtained. If, however, four atoms of hydrogen are added to one molecule of the original unsaturated halogenated ketone, the corresponding saturated halogenated alcohol is obtained; in this case not only the carbon to carbon double bond of the original unsaturated ketone is hydrogenated but also a hydrogenation of the ketone group to a secondary alcohol group has taken place.

The replacement of the halogen atom in the halogen containing reduction products can be carried out in any usual manner, for instance, by causing the halogen containing reduction products to react, according to the principle of double decomposition, with salts of carboxylic or sulfonic acids, whereafter the ester derivatives of the reduction products formed, if desired, are saponified. Other methods, however, may also be employed for the conversion of the halogen atom into the hydroxyl group; the halogen atom may, for instance, directly be exchanged by the hydroxyl group or other substituents may intermediately be introduced into the reduction products such as, for instance, the amino group, as it is described in Houben-Weyl, Methods of Organic Chemistry, 3rd vol., 3rd ed. (Leipzig 1930), p. 1216 seq.

The following examples serve to illustrate the invention without, however, limiting the same to them:

Example 1

517 mg. of dehydroandrosterone are dissolved in 30 ccs. of ether whereafter 936 mg. of dry, precipitated calcium carbonate are added thereto. The mixture is kept in a Dewar-flask at +14° C. and 10 ccs. of thionyl chloride are slowly dropped into the solution while stirring. After the reaction mixture has been allowed to stand for 4 hours at 14° C., the ether and the remaining thionyl chloride are evaporated at the same temperature. The residue is taken up with ether and the portions soluble in the ether are further purified by sublimation in a high vacuum. The halogen containing product, the unsaturated chloroketone, that is sublimated at 85–100° C. and 0.01 mm. Hg shows after repeated recrystallisation from dilute acetone a melting point of 154° C.

The unsaturated chloroketone is hydrogenated in alcoholic or glacial acetic acid solution in the presence of a palladium catalyst, for instance, palladium black, palladium-barium sulphate or palladium-calcium carbonate. If the hydrogenation is interrupted after two equivalents of hydrogen have been taken up by one mol of the unsaturated chloroketone, the saturated chloroketone of the formula $C_{19}H_{29}OCl$ is formed which is suitably isolated from the hydrogenation solution in the form of the semicarbazone. The saturated chloroketone crystallizes from dilute alcohol in needles having the melting point of 173° C.

By heating the saturated chloroketone with a mixture of potassium acetate and glacial acetic acid in a bomb tube for 5 hours at about 180° C. the chlorine atom is replaced by the acetoxy group. After the addition of water the dehalogenated reaction product is extracted from the reaction mixture with ether, the ethereal solution is washed with bicarbonate and water and freed from water by means of sodium sulphate. The residue obtained after evaporating the ether is purified by fractional sublimation in a high vacuum. The sublimate yields on recrystallisation from dilute alcohol the acetate of the saturated hydroxy ketone in the form of long needles having a melting point of 160–161° C.; from the acetate by saponification with methyl alcoholic potassium hydroxide solution the free saturated hydroxy ketone androsterone of the melting point 178° C. can be isolated.

Instead of potassium acetate other acetates as, for instance, silver acetate or quite generally the salts of carbonic and sulphonic acids may likewise be used.

*Example 2*

10 g. of dehydroandrosterone are digested with 500 ccs. of methyl alcohol saturated in the cold with gaseous hydrogen chloride and the mixture kept gently boiling for two hours. A red coloration occurring first turns light-yellow in the course of the reaction while a difficultly soluble partly crystalline reaction product is precipitated. After the reaction has been completed the mixture is cooled to minus 10° C. and the solution decantated from the crystalline precipitate. The mother liquor is diluted with water and extracted with ether. The precipitated reaction product as well as the residue obtained from the ethereal extract of the mother liquor are separately dissolved in 90% alcohol and to the alcoholic solutions a 1% solution of digitonine in 90% alcohol is added in excess. While the solution of the difficultly soluble reaction product practically gives no precipitation with digitonine, from the alcoholic solution containing the residue of the ethereal extract of the mother liquor a digitonide can be isolated wherefrom by decomposition with pyridine-ether dehydroandrosterone can be reobtained. The alcoholic solutions containing the reaction products that are not precipitated by digitonine are combined and evaporated to dryness. The residue is extracted with ether and the ethereal extract is evaporated to dryness. The halogen containing reaction products thus obtained are sublimated in a high vacuum, at 130–150° C. and 100–40 mm. Hg. The sublimated products are repeatedly recrystallized from dilute acetone and dilute alcohol; in this manner a pure chloroketone of the formula $C_{19}H_{27}OCl$ and of the melting point 154° C. is obtained.

The hydrogenation of the unsaturated chloroketone obtained to the corresponding saturated chloroketone can be carried out in the same manner as described in Example 1 by the addition of only 2 hydrogen atoms to one molecule of the unsaturated chloroketone. If, however, the hydrogenation of the unsaturated chloroketone is not interrupted after the absorption of 2 equivalents of hydrogen, but is continued until 4 equivalents of hydrogen are taken up by the unsaturated chloroketone, the corresponding saturated chloro-alcohol is obtained.

These methods of hydrogenation are described in Houben-Weyl, supra, 2nd vol., 3rd edition, pages 326 et seq. and 245 et seq.

The conversion of the chloro-compounds into the corresponding saturated free hydroxy compounds, the saturated hydroxy ketone androsterone or the saturated dialcohol androstandiol, may likewise be performed as described in Example 1.

Of course, various other modifications in the procedure of the process of the present invention may be resorted to within the scope of the appended claims without departing from the principles set forth herein.

The progress achieved by the present invention consists in that according to the process described the dehydro-androsterone of the formula $C_{19}H_{28}O_2$ can be converted into considerably more highly active reduction products, for instance, into androsterone of the formula $C_{19}H_{30}O_2$ or cis-androstandiol of the formula $C_{19}H_{32}O_2$ that are about 3 times or 10 times as active as the starting material.

What I claim is:

1. Method of producing reduction products of dehydroandrosterone which comprises reacting dehydroandrosterone of the formula $C_{19}H_{28}O_2$ with a halogenating agent capable of replacing the hydroxyl group with halogen, reacting the halogenated material with catalytically activated hydrogen to saturate the double bond, and then treating the saturated compound with agents capable of replacing the halogen with hydroxyl.

2. Method according to claim 1, wherein thionyl chloride is used as halogenating agent.

3. Method according to claim 1, wherein the reduction is carried out with hydrogen in the presence of a noble metal hydrogenation catalyst.

4. Method according to claim 1, wherein the hydogenation is interrupted when only two atoms of hydrogen have been added to the molecule of the unsaturated halogen-containing ketone.

5. Method according to claim 1, wherein the hydogenation is continued until four atoms of hydrogen have been added to the molecule of the unsaturated halogen-containing ketone.

6. Method according to claim 1, wherein the halogen-containing reduction products are caused to react with a number of the group consisting of organic carboxylic and sulfonic acid compounds, whereafter the ester derivatives formed are saponified.

7. Method according to claim 1, wherein the keto-group containing compounds are isolated from the reaction mixtures by means of ketone reagents capable of forming relatively insoluble condensation products with such keto compounds.

8. Method according to claim 1, wherein thionyl chloride is used as the halogenating agent, and wherein the reduction is carried out in the presence of a noble metal hydrogenation catalyst.

9. Method according to claim 1, wherein the agents capable of replacing the halogen with hydroxyl are a mixture of alkali metal acetate and acetic acid, and a substance capable of subsequently saponifying the so formed acetate to the corresponding hydroxy compound.

10. The process for the production of $\Delta^{5,6}$-3-halogen-etio-cholenone-(17) which comprises reacting upon dehydroandrosterone with a halogen compound capable of substituting a hydroxyl group with halogen.

11. The process for the production of $\Delta^{5,6}$-3-chlor-etio-cholenone-(17) which comprises reacting upon dehydroandrosterone with a halogenating agent consisting of thionyl chloride.

12. Method according to claim 1, wherein the reduction is carried out with hydrogen in the presence of a palladium catalyst.

ADOLF BUTENANDT.